Patented Dec. 14, 1948

2,456,184

UNITED STATES PATENT OFFICE 2,456,184

PURIFICATION OF TETRACHLORETHYLENE

William C. Greenwald, Niagara Falls, N. Y., assignor to E. I. du Pont de Nemours & Company, Wilmington, Del., a corporation of Delaware No Drawing. Application April 17, 1946, Serial No. 662,915

5 Claims. (Cl. 260—654)

This invention relates to a method for purifying and stabilizing tetrachlorethylene, which compound is also known as perchlorethylene. More particularly, it relates to a method for removing from tetrachlorethylene certain other chlorinated hydrocarbons which tend to impair the stability of tetrachlorethylene and restrict its industrial applications.

Tetrachlorethylene is used extensively in various industrial applications as a solvent in view of its excellent solvent power for oils and greases. When pure, it possesses a high degree of stability and resistance to the action of heat, light, oxygen, water, etc. However, when made by one of the more important methods used for its preparation, tetrachlorethylene is usually contaminated by small amounts of certain other chlorinated hydrocarbons notably 1,1,2-trichlorethane and asymmetrical (1,1,1,2-) tetrachlorethane which tend to reduce markedly the stability of tetrachlorethylene.

There are several well-known methods for preparing tetrachlorethylene. One of the more important of such methods utilizes acetylene and chlorine as basic raw materials. The method involves the chlorination of acetylene to form tetrachlorethane which is converted by dehydrochlorination to trichlorethylene. The latter compound is then chlorinated to produce pentachlorethane which is finally dehydrochlorinated to obtain the desired tetrachlorethylene according to the following equations:

1. $CH \equiv CH + 2Cl_2 \rightarrow CHCl_2CHCl_2$
2. $CHCl_2CHCl_2 \rightarrow CHCl = CCl_2 + HCl$
3. $CHCl = CCl_2 + Cl_2 \rightarrow CHCl_2CCl_3$
4. $CHCl_2CCl_3 \rightarrow CCl_2 = CCl_2 + HCl$ In actual practice of the above process, various side reactions occur in addition to the reactions represented by the above equations. The result is that the final product, although predominantly tetrachlorethylene, contains minor amounts of other chlorinated hydrocarbons, such as trichlorethylene boiling at 87° C., 1,1,2-trichlorethane boiling at 114° C., asymmetrical tetrachlorethane boiling at 129° C., pentachlorethane boiling at 159° C. and hexachlorethane boiling at 184° C. The majority of such impurities may be separated from the desired tetrachlorethylene which boils at 121° C. by the usual methods of fractional distillation. However, two of the above impurities, namely asymmetrical tetrachlorethane and 1,1,2-trichlorethane not only possess boiling points within a few degrees of the boiling point of tetrachlorethylene, but they also tend to form constant boiling mixtures with tetrachlorethylene so as to make it practically impossible to separate completely these impurities by fractional distillation methods.

Tetrachlorethylene is also obtained as a valuable by-product of the process for producing trichlorethylene represented by reaction Equations 1 and 2 above. In the reaction to produce symmetrical tetrachlorethane (Equation 1) there is also formed some pentachlorethane which, upon being subjected to dehydrochlorination, yields tetrachlorethylene as a by-product of the reaction represented by Equation 2. The by-product tetrachlorethylene is recovered as a still residue when the crude trichlorethylene is fractionally distilled. Such residues contain various chlorinated hydrocarbons in addition to tetrachlorethylene, most of which can be removed by treatment with a slurry of lime followed by steam distillation and fractional distillation. However, the tetrachlorethylene so obtained generally still contains small but objectionable quantities of asymmetrical tetrachlorethane and 1,1,2-trichlorethane as impurities which cannot be separated by fractional distillation methods.

The presence of either asymmetrical tetrachlorethane or 1,1,2-trichlorethane in tetrachlorethylene is highly objectionable because they tend to decompose upon exposure to light, heat, moisture or oxidizing influences, with the formation of corrosive acidic decomposition products. The formation of such decomposition products renders the tetrachlorethylene corrosive to metal containers or metal equipment in which the tetrachlorethylene may be stored or used and makes the tetrachlorethylene unfit for use in certain important applications.

The practical importance of eliminating asymmetrical tetrachlorethane and 1,1,2-trichlorethane impurities from tetrachlorethylene is indicated by the large number of methods which have been proposed for the purification of tetrachlorethylene. Most of such methods involve treatments which change those impurities chemically into derivatives which may be more readily separated from the tetrachlorethylene. Such treatments generally involve the use of costly chemicals and equipment and involve additional treatment steps which add appreciably to the cost of the purified product and complicate considerably the overall processing operations which are necessary.

It is an object of my invention to provide a simple yet highly effective method for removing from tetrachlorethylene impurities, such as asymmetrical tetrachlorethane and 1,1,2-trichlorethane. A further object is the provision of a practical method for purifying tetrachlorethylene and obtaining a more stable product. These and still further objects will be apparent from the ensuing description of the invention.

My invention is primarily concerned with the purification of tetrachlorethylene obtained by methods which involve the use of acetylene and chlorine as basic raw materials. However, it may be utilized to purify any tetrachlorethylene which contains as impurities minor amounts of asymmetrical tetrachlorethane or 1,1,2-trichlorethane. Accordingly, the above objects are accomplished in accordance with the invention by subjecting tetrachlorethylene which contains as impurities either one or both of the above compounds to an extraction treatment using as the extracting liquid a mixture of an alcohol and water. Alcohols which may be used are the butanols, the propanols, ethanol and methanol. The extracting liquid should contain sufficient water to render it immiscible with the tetrachlorethylene. The extraction may be carried out by any of the various well-known methods for extracting one liquid with another and may be accomplished batchwise or continuously.

One effective way of practicing the invention involves flowing the impure tetrachlorethylene down through an extraction column countercurrently to the flow of, for example, a methanol-water mixture. The tetrachlorethylene from which impurities have been extracted is removed continuously from the bottom of the column and a methanol-water solution containing dissolved therein asymmetrical tetrachlorethane and 1,1,2-trichlorethane which have been removed from the tetrachlorethylene are withdrawn from the top of the column. The effluent tetrachlorethylene from the extraction column may then be subjected to fractional distillation to remove small quantities of water and methanol or may be merely subjected to a drying treatment after which it will be found that its stability has been greatly improved. The water-methanol solution from the top of the column may be subjected to further processing to recover methanol therefrom which may be mixed with a suitable quantity of water for reuse.

The invention is further illustrated by the following example:

*Example*

An extraction column consisting of a glass tube 25 mm. in diameter and 64" high was secured in a vertical position and filled with ¼" packing rings. Crude tetrachlorethylene containing substantial quantities of asymmetrical tetrachlorethane and 1,1,2-trichlorethane as impurities was continuously fed in at the top of the column while a stream of a solution containing 90% by volume of methanol and 10% of water was continuously fed in at the bottom of the column. The packing material in the column served to increase the contact area and to provide turbulence in the countercurrently flowing streams. The methanol-water solution which was continuously removed from the top of the column contained substantial quantities of dissolved chlorohydrocarbons while the tetrachlorethylene which was continuously removed from the bottom of the column was relatively free from its starting impurities but contained some small quantities of dissolved methanol and water. The rate of flow of tetrachlorethylene through the column varied between 18 to 50 cc./min. while the rate of flow of the methanol-water solution varied between 70 to 140 cc./min. The effluent tetrachlorethylene was dried and then tested to determine its stability and physical characteristics. The methanol-water solution from the top of the column was further processed to recover methanol therefrom. For comparative purposes, the tests upon the purified tetrachlorethylene were duplicated employing the untreated crude tetrachlorethylene.

Experience in testing perchlorethylene has shown that a fairly good approximation of the contents of asymmetrical tetrachlorethane and 1,1,2-trichlorethane may be obtained by means of a "caustic consumption" test. Such a test involves refluxing for 24 hours a mixture of 50 cc. of tetrachlorethylene and 50 cc. 0.2 N sodium hydroxide solution and at the end of that time titrating the unconsumed sodium hydroxide in 1 cc. of the aqueous layer using a 0.01 N hydrochloric acid solution. The caustic consumed by 1 cubic centimeter of tetrachlorethylene is expressed in terms of the number of cubic centimeters of 0.01 N sodium hydroxide solution equivalent thereto. The amount of caustic consumed has been found to be roughly proportional to the amount of such impurities present in the tetrachlorethylene. The stability of tetrachlorethylene may be conveniently determined by refluxing a 125 cc. sample with 125 cc. of water for 64 hours and then titrating the aqueous layer with 0.01 N sodium hydroxide solution to determine the amount of acidity developed. The results are expressed in terms of the number of cubic centimeters of 0.01 N sodium hydroxide equivalent to the acidity developed in 25 cc. of the aqueous layer. Such a test is usually carried out in the presence of a weighed copper strip and after the test the strip is reweighed to determine its weight loss.

The effectiveness of the above extraction treatment in removing asymmetrical tetrachlorethane and 1,1,2-trichlorethane impurities is shown by the following data which were obtained by testing the crude tetrachlorethylene used in the above example by the standard tests described above and also the purified tetrachlorethylene after it had been subjected to the extraction treatment and then dried.

|  | A. S. T. M. Boiling Rg. | | Sp. Gr. 15/4° C. | Caustic Consumption | 64 Hour Copper Stab. Test | |
| --- | --- | --- | --- | --- | --- | --- |
|  | 1st drop | Last drop |  |  | Acid Formation | Loss in Wt. of Copper Strip, g. |
| Product before extraction | °C. 120.25 | °C. 125.45 | 1.621 | 60.9 | 212 | 0.590 |
| Product after extraction | 120.75 | 121.7 | 1.629 | 4.6 | 1.6 | 0.005 |

It is obvious from the above data that the treated tetrachlorethylene is substantially purer and much more stable than the untreated material. The improved purity of the treated product is indicated by its narrower boiling range and specific gravity as well as by the results of the caustic consumption tests. The improved stability of the treated product is shown by the fact that acid formation was almost negligible as compared with the development of an acidity equivalent to 212 cc. of 0.01 N sodium hydroxide solution per 25 cc. of the untreated sample. Also, the corrosion of copper was very much less after purification than before purification.

The methanol-water solution which is used to extract impurities from the tetrachlorethylene must contain sufficient water to render it immiscible with the tetrachlorethylene. Generally, quantities of water substantially less than about 5% by volume will be insufficient for this purpose. I prefer to use amounts of water corresponding to 5 to 15% by volume of the extracting liquid although good results may be obtained using even larger amounts. However, as the quantity of water is increased beyond about 50% by volume, the effectiveness of the extracting liquid becomes so reduced as to render the use of such liquids impracticable. The preferred extracting liquid will consist of 5 to 15% water and 85 to 95% methanol by volume.

The extraction may be carried out effectively batchwise, but the countercurrent continuous method is generally more satisfactory for commerical purposes. Extraction is conveniently carried out at ordinary temperatures and pressures although operation at temperatures either above or below room temperature and at pressures either above or below atmospheric pressures may be employed if desired.

In commercial applications of the present invention, it will, of course, be advantageous to recover methanol from the methanol-water solutions containing the impurities which have been extracted. Since the chlorinated hydrocarbons which are removed by the extracting liquid form constant boiling mixtures with boiling points slightly lower than the boiling point of methanol, merely subjecting the methanol-water chlorohydrocarbon solution to fractional distillation is not entirely satisfactory. I prefer to dilute the mixture with about an equal part of water which generally results in the formation of a separate chlorohydrocarbon phase which may then be removed from the remaining water-methanol phase. The water-methanol phase may then be subjected to fractional distillation. The first fractions obtained upon such distillation will contain some chlorohydrocarbons in the form of constant boiling mixtures, but if the distillation is continued, a methanol fraction will be obtained which is relatively free from the chlorohydrocarbons. A practical way of utilizing the recovered fractions is to mix with those fractions first obtained the desired amount of water and methanol and feed the resulting mixture to the extraction column at about the middle of its height. The distillation fractions which are relatively free from chlorinated hydrocarbons may be mixed with additional quantities of methanol and water and fed to the bottom of the extraction column. By operating in this manner, most of the methanol may be recovered and reused so that the overall chemical cost of the purification treatment will be slight.

Ethanol may be used in the extraction liquid in place of methanol with good results. The propanols and butanols may also be used, but the employment of ethanol or methanol, particularly the latter, is more practicable and is preferred.

The quantity of water to be used will depend upon the particular alcohol employed, but in any case the amount should be sufficient to render the liquid immiscible with the tetrachlorethylene. Similarly, the maximum amounts of water that may be used with practical results as well as the amounts which give optimum results will vary depending upon the alcohol chosen.

Various modifications may be made in the details and illustrations set forth above without departing from the spirit and scope of the invention. It is accordingly to be understood that the invention is not restricted to such details except as indicated in the appended claims.

I claim:

1. A method of removing impurities of the class consisting of 1,1,2-trichlorethane and asymmetrical tetrachlorethane from tetrachlorethylene comprising subjecting the impure tetrachlorethylene to an extraction treatment with a liquid which is immiscible with said tetrachlorethylene, said liquid comprising 50 to 95% of methanol and 5 to 50% water by volume.

2. A method of removing impurities of the class consisting of 1,1,2-trichlorethane and asymmetrical tetrachlorethane from tetrachlorethylene comprising subjecting the impure tetrachlorethylene to an extraction treatment with a liquid which is immiscible with said tetrachlorethylene, said liquid comprising 85 to 95% methanol and 5 to 15% water.

3. A method of removing impurities of the class consisting of 1,1,2-trichlorethane and asymmetrical tetrachlorethane from tetrachlorethylene comprising intimately contacting impure tetrachlorethylene with a liquid while said impure tetrachlorethylene and said liquid are flowing countercurrently with respect to each other, said liquid comprising 50 to 95% methanol and 5 to 50% water by volume.

4. A method of removing impurities of the class consisting of 1,1,2-trichlorethane and asymmetrical tetrachlorethane from tetrachlorethylene comprising intimately contacting impure tetrachlorethylene with a liquid while said impure tetrachlorethylene and said liquid are flowing countercurrently with respect to each other, said liquid comprising 85 to 95% methanol and 5 to 15% water by volume.

5. A method of removing impurities of the class consisting of 1,1,2-trichlorethane and asymmetrical tetrachlorethane from tetrachlorethylene comprising continuously feeding the impure tetrachlorethylene to the top of an extraction column and a liquid comprising 85 to 95% methanol and 5 to 15% water to the bottom of said column, and continuously withdrawing a methanol-water solution containing said impurities dissolved therein from the top of said column and tetrachlorethylene from which said impurities have been removed from the bottom of said column.

WILLIAM C. GREENWALD.

REFERENCES CITED

The following references are of record in the file of this patent:

UNITED STATES PATENTS

| Number | Name | Date |
|---|---|---|
| 2,084,937 | Britton et al. | June 22, 1937 |
| 2,120,668 | Hanson et al. | June 4, 1938 |
| 2,280,794 | Cass | Apr. 28, 1942 |